DOUBLE-SIDEBAND COMMUNICATION SYSTEM

Filed March 30, 1964 2 Sheets-Sheet 1

Nov. 14, 1967 SYUITI HAYASI ET AL 3,353,099

DOUBLE-SIDEBAND COMMUNICATION SYSTEM

Filed March 30, 1964 2 Sheets-Sheet 2

United States Patent Office 3,353,099
Patented Nov. 14, 1967

3,353,099

DOUBLE-SIDEBAND COMMUNICATION SYSTEM

Syuiti Hayasi, Ohta-ku, Tokyo, and Junzo Murakami, Kawasaki-shi, Japan, assignors to Tokyo Shibaura Electric Co., Ltd., Kawasaki-shi, Japan, a corporation of Japan

Filed Mar. 30, 1964, Ser. No. 355,720
Claims priority, application Japan, Aug. 16, 1963, 38/43,027
2 Claims. (Cl. 325—60)

ABSTRACT OF THE DISCLOSURE

A double side-band radio communication system utilizing a double-sideband signal which includes a pair of sidebands and a carrier wave signal having its phase shifted about ninety degrees from its normal phase relation with respect to the sidebands so as to readily separate the carrier wave signal after amplifying the double-sideband signal by means of a parametric amplifier.

This invention relates to improvements in and relating to a double-sideband communication system utilizing a parametric amplifier.

Generally in a parametric amplifier there are used a signal frequency $f_1$ to be amplified, an idler frequency $f_2$ to be produced therein, and a pumping frequency $f_3$ and the relations among these three frequencies are represented by the following equations.

$$f_1+f_2=f_3,\ f_2=f_3-f_1 \qquad (1)$$

It is well known in the art that the circuit for the idler frequency $f_2$ is essential to the operation of a parametric amplifier and there is the following relation.

$$F=1+\frac{G_1}{G_g}+\frac{G}{G_g}\cdot\frac{f_1}{f_2} \qquad (2)$$

where F indicates the noise figure, $G_1$ the conductance of the signal circuit, $G_g$ the conductance of the diode on the signal input circuit and G the negative conductance produced by the parametric phenomenon. In the above equation it is difficult to decrease the second term because it is determined on the signal input side. Whereas the third term represents an equivalently converted noise from the idler circuit to the input signal circuit so that by minimizing this term it is possible to improve the noise figure.

Thus, firstly it is natural to decrease the ratio $f_1/f_2$ by increasing $f_2$. According to the above Equation 1, this can be easily realized by increasing the frequency of the pumping signal, but practically there is a certain limit in the improvement of the noise figure.

The term $G/G_g$ represents the equivalent conversion of the noise generated in the idler circuit into the noise in the signal circuit. In ordinary parametric amplifiers as a resonance circuit and an idler circuit on its input as well as output sides are coupled together in the interior of the amplifier it is difficult to isolate on the input side the input signal frequency $f_1$ from a noise contained in an idling signal having different frequency $f_2$.

In order to effectively eliminate the above mentioned defects and also to provide more sensitive and extremely low noise characteristic there has been proposed an improved double-sideband communication system which can reduce undesirable noise energy by introducing the received signal not only into the signal circuit but also into the idler circuit. However by this arrangement as it is necessary to separate weak carrier wave signal, high quality filters were required. Moreover it was extremely difficult to separate only the carrier signal without any appreciable loss.

Accordingly it is the principal object of this invention to obviate the above mentioned defects and to provide a novel double-sideband communication system which enables the use of weaker carrier wave signal in the transmission signal and also to simplify the construction of the receiver.

This invention can be more fully understood from the following description by reference to the accompanying drawings, in which.

At first a prior communication system will be shortly described. As mentioned hereinabove, in a receiver employed in the prior system, undesirable noise energy generated in an idler circuit was suppressed by introducing in the input side of a parametric amplifier in the receiver two input waves each corresponding to a signal frequency and an idler frequency and both modulated by the same information signal.

Figure 1:
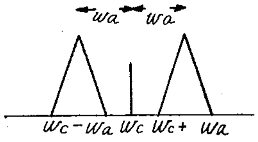
FIG. 1 shows frequency distribution of transmitted signals which is helpful in understanding the prior art double-sideband communication system.
Figure 2:
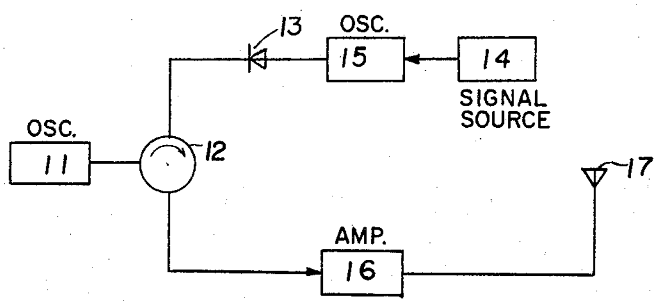
FIG. 2 shows a block diagram illustrating one example of a transmitter employed in a prior system.

More particularly as shown in FIG. 1, two signals, each having frequencies $Wc+Wa$ and $Wc-Wa$ respectively, are applied to the input side of a parametric amplifier, said two signals being selected to have frequencies commensurate with the resonant frequencies of the signal circuit and of the idler circuit. Actually, although $Wa$ is modulated by an audio frequency signal and the like signal, for the sake of explanation, said two signals are shown in FIG. 1 as two signals having frequency distributions about a pair of centers which are symmetrical with respect to an imaginary frequency $Wc$ which is located at the center between two signal frequencies. The above mentioned relation is shown by a microwave transmission signal having a frequency distribution as shown in FIG. 1, and an example of means for providing such a transmission signal is shown in FIG. 2.

A microwave signal having a frequency of $Wc$ is obtained from a microwave oscillator 11 and applied to a diode 13 through a circulator 12 having its forward direction as indicated by an arrow. The required output signal to be transmitted is obtained from a signal source 14 to modulate a signal having a frequency of $Wa$ obtained from a subcarrier oscillator 15. The resulting modulated signal is applied to the diode 13 to modulate said microwave signal to produce transmitting signal comprising a carrier wave signal $Wc$ and two sideband signals $Wc \pm Wa$.

The transmission signal is again passed through the circulator 12 to be amplified by an amplifier 16 such as a travelling wave tube amplifier and the like and then sent out from an antenna 17. An example of a receiver circuit employed in the prior circuit will be described hereunder by referring to FIG. 3.

The transmitted signal having a frequency spectrum covering the carrier wave signal $Wc$ and sideband signals $Wc \pm Wa$ which are symmetrical with respect to said carrier wave signal is received by a receiving antenna 21. As mentioned above, the frequencies of said sideband signals $Wc+Wa$ and $Wc-Wa$ commensurate with the resonant frequencies of the signal circuit and of the idler circuit included in the parametric amplifier. The carrier wave signal $Wc$ of the received signal received by the antenna 21 is separated by a filter 22 and the remaining sideband signals are applied to a parametric amplifier 24 by way of a circulator 23 having its forward direction indicated by an arrow. After being amplified by the amplifier 24 the signals are supplied to the succeeding circuit 25 including a detector circuit and the like again through the circulator 23. On the other hand the carrier wave signal $Wc$ separated by a filter 22 included in a stage preceeding circulator 23 is introduced to an automatic phase control system 20 comprising a phase detector 26, a voltage controlled oscillator 27 and the like.

The output signal from the voltage controlled oscillator 27 comprising the control system 28 is applied to the phase detector 26 to be multiplied by a carrier wave signal separated by the filter 22, thus detecting a low frequency error signal. The detected low frequency error signal if fed back to the oscillator 27, the output signal therefrom being synchronized in phase with the carrier wave signal $Wc$ contained in the received signal. Thus, the output signal of the voltage controlled oscillator 27 which is derived from said automatic phase control system 28 and applied to a frequency multiplier 29 is in the form of a continuous wave signal which is in phase synchronism with said carrier wave signal. The continuous wave signal, the frequency thereof being doubled by the frequency multiplier 29, is utilized as the driving power of the parametric amplifier 24.

The manner in which the carrier wave signal is separated from the received signal, shown in FIG. 1, after amplified by the parametric amplifier will now be analyzed mathematically.

The received signal $l_1$ shown in FIG. 1 is represented by the following Equation 3.

$$l=E_1\ (\cos Wat\cdot\cos Wct+k\cos Wct) \qquad (3)$$

where $Wc$ represents the carrier wave signal, $Wa$ a sub-carrier wave signal, and $k$ a coefficient representing the magnitude of the carrier wave signal with respect to the sub-carrier wave signal. Actually said sub-carrier wave signal is modulated by an audio frequency signal and the like, but for the purpose of explanation it is simply designated as $Wa$. As the driving power for the parametric amplifier a signal is used which is obtained by doubling the frequency signal of the voltage controlled oscillator whose phase is the same as that of the carrier wave signal shown by the second term of the Equation 3. Accordingly, the oscillation signal frequency is equal to $Wc$ and if it is assumed that its phase is different by $\theta$ from that of the carrier wave signal, the oscillation signal $l_2$ can be shown as follows:

$$l_2=E_2\cos(Wct+\theta) \qquad (4)$$

and the driving power $l_3$ for the amplifier which is obtained by doubling the frequency of said oscillation signal can be shown by $$l_3=E_3\cos(2Wct+2\theta) \qquad (5)$$

The received signal $l_1$ is amplified by said parametric amplifier operated by said driving power and the amplified output $l_1'$ is shown by $$l_1'=GE_1\cos\theta\cdot\cos Wat\cdot\cos(Wct+\theta)+kGE_1\cos\theta\cdot\cos(Wct+\theta)$$

where G represents the voltage gain of the parametric amplifier. The carrier wave signal represented by the second term of the Equation 6 is separated and is then applied to the phase detector. Through the action of the phase detector the carrier wave signal is multiplied by the oscillation signal, as shown by the Equation 4, of the voltage controlled oscillator whereby to detect a low frequency output represented by $$K\cos\theta \qquad (7)$$

This low frequency signal having a relation $K\propto kE_1E_2G$ is fed back to the voltage controlled oscillator to control the phase of the oscillation signal $l_2$ so as to make the output of the low frequency signal equal to zero. As a result, upon completion of the phase control, a condition will be attained wherein $$\theta=\frac{\pi}{2}$$

At the same time the sideband signal output represented by the first term and including an audio frequency signal component of the amplified output $l_1'$ shown by said Equation 6 is also made zero, thus providing no signal component.

As already pointed out hereinabove while with the prior dual-channel communication system utilizing a parametric amplifier, communication with low noise characteristic is possible it is necessary to separate the carrier wave signal in a stage preceding to the amplifier. By this reason, in the prior system it has been required to separate a weak carrier wave signal by means of a filter of superior characteristics. In addition it has been very difficult to separate the carrier wave component from the sideband signals without accompanying loss.

In order to provide the required signal component separated from the carrier wave signal after amplifying the received signal, according to this invention a signal represented by the following equation is transmitted as the transmission signal:

$$e=E(\cos Wa\cdot t\cdot\cos Wct+k\sin Wct) \qquad (8)$$

The transmission signal represented by the Equation 8 corresponds to the second term of the transmission signal $e_1$ utilized in the prior system, whose phase being shifted by 90° with respect to the first term. While phase shift of 90° is most suitable the inventors have confirmed by experiment that variations within ±20° may be permitted in the practical applications.

Figures 3, 4:
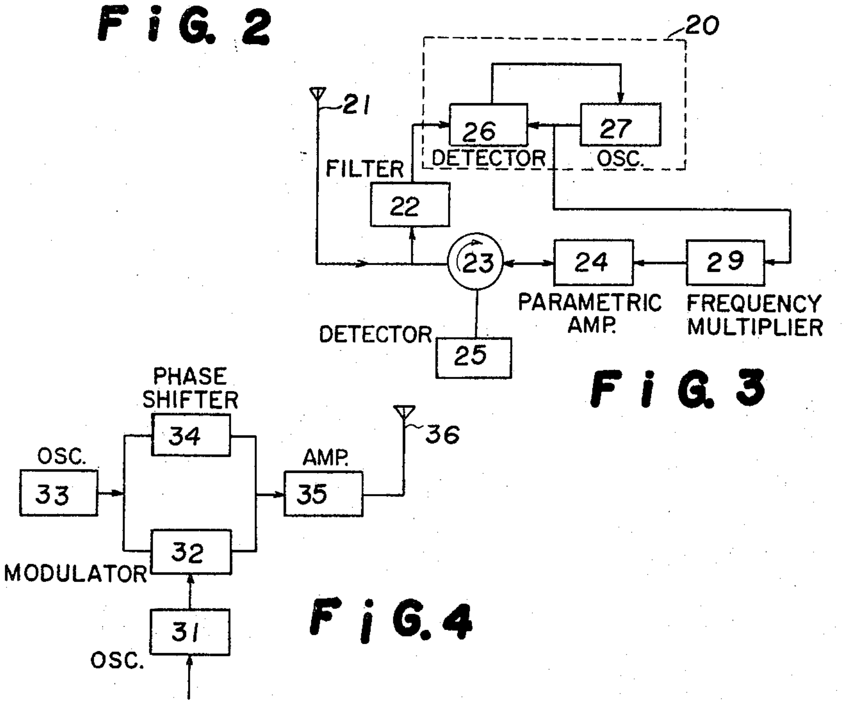
FIG. 3 shows a block diagram illustrating one example of a receiver employed in the prior system.
FIG. 4 shows a block diagram of one example of a transmitter for providing transmission signals suitable for use in this invention.
Figure 5:
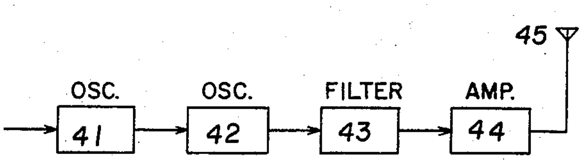
FIG. 5 shows a modification of a transmitter for providing transmission signals suitable for use in this invention.

Referring now to FIGS. 4 and 5 an example of a circuit construction of a transmitter suitable for providing a transmission signal represented by the Equation 8 and is suitable for carrying out this invention will be described in brief.

FIG. 4 shows a block diagram of the so-called Armstrong's FM system. In this system a modulated signal that is obtained by modulating the signal from a sub-carrier wave oscillator 31 by a signal having an audio frequency is applied to a balanced modulator 32, wherein one portion of the carrier wave signal derived from a carrier wave oscillator 33 is subjected to balanced modulation to obtain an output signal comprising two sideband signals.

The other portion of the carrier wave signal is shifted 90° in phase by a 90° phase shifter 34 and is then added to said sideband signals derived out from the balanced modulator 32 to produce a transmission signal suitable for use in this invention. The transmission signal is transmitted from a transmitting antenna 36 after being amplified by a power amplifier 35.

In addition to the transmission system just described a conventional FM transmission system shown in FIG. 5 can also be utilized. In this type of transmission system a signal having audio frequency is employed to modulate the oscillation frequency of a sub-carrier wave oscillator 41 and the resulted modulated signal is utilized to frequency modulate the carrier wave signal from a carrier wave oscillator 42. Sideband signals above the second sideband are filtered out by means of a bandpass filter 43 and the remaining signals are sent out from transmitting antenna 45 after being amplified by a power amplifier 44.

Figure 6:
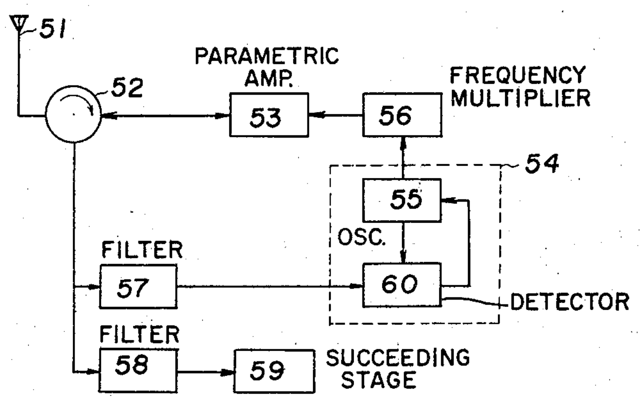
FIG. 6 shows a block diagram of a receiver suitable for use in this invention.

FIG. 6 shows a block diagram of a receiver suitable for use in this invention. As already mentioned the received signal $l_1$ arriving at a receiving antenna 51 is represented by an equation $$l_1=Ei(\cos Wat\cdot\cos Wct+k\sin Wct) \qquad (9)$$

The received signal $l_1$ is applied to a parametric amplifier 53 through a circulator 52 with its forward direction indicated by an arrow. On the other hand the driving power $l_3$ for the amplifier 53 is supplied from a voltage controlled oscillator 55 which constitutes an automatic phase control system 54. Thus the frequency of an oscillation signal $l_2$ having the same frequency as the carrier wave signal of the received signal is doubled by a frequency multiplier 56 to serve for this purpose.

Accordingly the oscillation signal $l_2$ and the driving power $l_3$ can be represented by the following equations which are similar to said Equations 4 and 5.

$$l_2=E_2 \cos (Wct+\theta) \quad (10)$$

$$l_3=E_3 \cos (2Wct+2\theta) \quad (11)$$

The received signal $l_1$ applied to the parametric amplifier 53 driven by the driving power $l_3$ is amplified to produce an amplified output $l_0$.

$$l_0=GE_0 \cos \theta \cos Wat \cos (Wct+\theta) + kGE_0 \sin \theta \cdot \cos (Wct+\theta) \quad (12)$$

Again through the circulator 52, the amplified output $l_0$ is supplied to a filter circuit comprising filters 57 and 58 adapted to selectively pass the carrier wave signal and the sideband signal respectively. In the filter circuit, the sideband signal represented by the first term and containing the signal component such as an audio frequency signal and the like is separated by the filter 58 and is then supplied to the circuit of the succeeding stage 59. While the carrier wave signal separated by the filter 57 and represented by the second term of the Equation 12 is applied to a phase detector 60 of an automatic phase control system 54. The detector 60 multiplies said carrier wave signal by the oscillation signal from the voltage controlled oscillator 55 to detect a low frequency output signal represented by $$K \sin \theta \quad (13)$$

The low frequency output signal having a relation $K \infty kGE_0E_2$ is fed back to the voltage controlled oscillator 55 to control the phase $\theta$ of the oscillation signal $l_2$ from the oscillator 55 so as to make zero said output signal. Accordingly when the automatic phase control is effected perfectly, angle $\theta$ is made equal to zero. Then the amplified output $l_0$ will be represented by $$l_0=GE_0 \cos Wat \cdot \cos Wct \quad (14)$$

and the sideband signal containing the signal component is amplified with the maximum gain.

Thus, it will be clear that, in this system, a single parametric amplifier acts as an amplifier for the sideband signal whereas as a phase detector for a carrier wave signal.

In the above embodiment, the voltage controlled oscillator may be previously arranged in such a manner that the number of the frequency of an oscillation signal of said oscillator is two times larger than that of the carrier wave signal included in the received signal in order to directly use said oscillation signal as the driving power to the parametric amplifier. According to this method, it is not necessary to double the frequency of said oscillation signal when supplied to the amplifier. However, it is necessary that the frequency of the oscillation signal emitted from said oscillator to a phase detector is converted into one-half of said frequency by means of a frequency divider.

Figure 7:
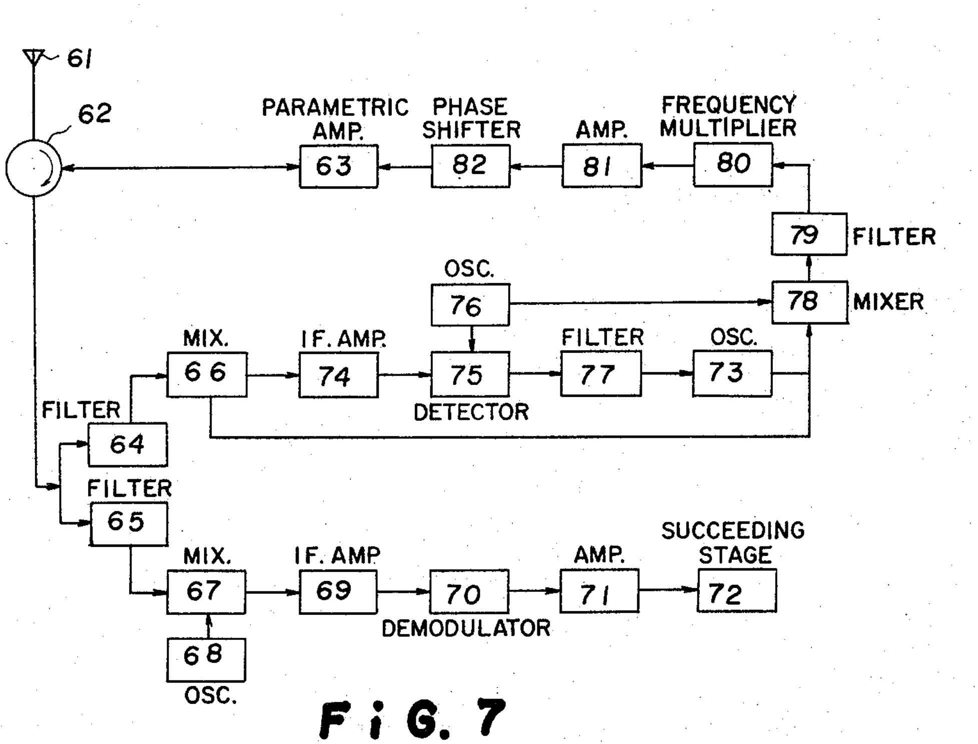
FIG. 7 shows a modified receiver suitable for use in this invention.

Referring now to FIG. 7 a modified receiver suitable for use in the present communication system will be described.

In the following, in order to have better understanding of the invention it is assumed that the carrier wave frequency of the received signal is equal to 2800 mc. and that the frequency of the sub-carrier wave modulated by the ratio frequency signal is equal to 30 mc.

The signal received by a receiving antenna 61 is supplied to and amplified by a parametric amplifier 63 through a circulator 62 with its forward direction represented by an arrow. The amplified output is again passed through the circulator and then divided into two portions which are respectively supplied to a filter 64 adapted to pass the carrier wave signal and a filter 65 adapted to pass the sideband signal. These filters 64 and 65 are respectively connected with mixers 66 and 67 to which are connected an automatic phase control system comprising a phase detector, a voltage controlled oscillator and the like, and a detector circuit including a demodulator and the like.

The sideband signal of 2770 mc., derived out through one of said filter, i.e. filter 65, and containing the signal having audio frequency is mixed with the oscillation signal of 2740 mc. produced by a local oscillator by the action of the mixer 67 and hence converted into a signal of an intermediate frequency of 30 mc. After amplified by an intermediate frequency amplifier 69, this signal of an intermediate frequency is supplied to a demodulator 70 to detect a low frequency signal having an audio frequency which is supplied to a circuit of a succeeding stage through a low frequency amplifier 71. On the other hand the carrier wave signal separated by the other filter 64 and having a frequency of 2800 mc. is mixed with an oscillation signal supplied from a voltage controlled oscillator 73 and having a frequency of 2830 mc., by the action of a mixer 66 to be transformed into a signal having an intermediate frequency of 30 mc.

The intermediate frequency signal is amplified by an intermediate frequency amplifier 74 and is then supplied to a phase detector 75 to be multiplied by an oscillation signal from a stabilized oscillator 76 and having a frequency of 30 mc. to detect the low frequency signal. This low frequency signal is applied to a voltage controlled oscillator 73 through a low pass filter 77 to control the phase of the oscillation signal produced thereby so as to make the output signal equal to zero.

Further, the oscillation signal (2830 mc.) from the voltage controlled oscillator 73 and the oscillation signal (30 mc.) from the stabilized oscillator 76 are mixed within a mixer 78 to produce an output therefrom comprising two frequencies of 2800 mc. and 2860 mc. Only the signal having a frequency of 2800 mc. is derived out through a band pass filter 79 connected to the mixer 78 and then have its frequency doubled by the action of a frequency multiplier 80 and the signal having doubled frequency of 5600 mc. is introduced into a variable phase shifter 82 after being amplified by an amplifier 81, it being understood that the phase shifter 82 serves to modify the phase of the signal having doubled frequency so as to cause to act as an amplifier said parametric amplifier driven by said multiplied signal.

In the above described embodiments amplified output from a parametric amplifier is divided into two portions and each of them is respectively supplied through a filter to a mixer coupled with an automatic phase control system and to mixer coupled with a detector circuit. However, two portions of the amplified output may be supplied to mixers, one of which is coupled with an automatic phase control device and the other is coupled with a detector circuit through unidirectional transmission lines such as isolators or the like. For example, said isolator, not shown, is connected between the filter 64 and the mixer 66 in FIG. 7. By this modified circuit arrangement undesirable function caused by the interference between the two mixers can be eliminated more effectively.

As can be easily noted from the foregoing description, according to this invention it is possible to separate a carrier wave signal after the received signal has been amplified so that the loss of the input transmission circuit is minimized and separation of the carrier wave signal is effected more easy. In addition, the construction of the receiver is simplified and electric power required for transmitting the carrier wave signal is greatly reduced.

While particular embodiments have been shown and described it should be understood that this invention is not limited to the specific embodiments and that various changes and modifications may be made without departing from the true spirit and scope of this invention as described in the appended claims.

What is claimed is:

1. A double-sideband radio communication system utilizing a parametric amplifier comprising, means to produce and transmit a double-sideband signal which has a pair of sidebands and a carrier wave signal, the phase of the carrier wave signal being shifted substantially to a phase angle of 90° from its normal phase relation with respect to said sidebands;

means to receive said double-sideband signal and amplify the same by means of a parametric amplifier, means to separate said carrier wave signal from the amplified received signal;

an automatic phase control device to attain phase synchronism by the separated carrier wave signal;

an oscillator controlled by means of said device; and, means to drive said parametric amplifiers with the output of said oscillator so as to separate the carrier wave signal after the received signal has been amplified.

2. A double-sideband radio communication system utilizing a parametric amplifier comprising;

means to produce and transmit a double-sideband signal which has a pair of sidebands and a carrier wave signal, the phase of the carrier wave signal being shifted subtsantially to a phase angle of 90° from its normal phase relation with respect to said sidebands;

means to receive said double-sideband signal and amplify the same by means of a parametric amplifier;

a filter separating said carrier wave signal from the amplified received signal;

an isolator adapted to pass the separated carrier wave signal;

an automatic phase control device to attain phase synchronism by said separated carrier wave signal;

an oscillator connected to said isolator and controlled by means of said device; and, means to drive said parametric amplifier by the output of said oscillator so as to separate the carrier wave signal after the received signal has been amplified.

References Cited

UNITED STATES PATENTS

| | | | |
|---|---|---|---|
| 1,935,776 | 11/1933 | Hammond | 325—65 |
| 2,794,910 | 6/1957 | Arends | 325—421 X |
| 3,217,259 | 11/1965 | Kotzebue et al. | 325—445 X |

JOHN W. CALDWELL, *Primary Examiner.*

B. V. SAFOUREK, *Assistant Examiner.*